United States Patent
Stam et al.

(10) Patent No.: US 6,631,316 B2
(45) Date of Patent: Oct. 7, 2003

(54) IMAGE PROCESSING SYSTEM TO CONTROL VEHICLE HEADLAMPS OR OTHER VEHICLE EQUIPMENT

(75) Inventors: Joseph S. Stam, Holland, MI (US); Mark W. Pierce, Grandville, MI (US); Harold C. Ockerse, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/799,310

(22) Filed: Mar. 5, 2001

(65) Prior Publication Data

US 2002/0156559 A1 Oct. 24, 2002

(51) Int. Cl.⁷ ............................. G06F 7/00; H01L 27/00
(52) U.S. Cl. ...................................... 701/36; 250/208.1
(58) Field of Search ............................ 701/36; 359/111; 250/208.1

(56) References Cited

U.S. PATENT DOCUMENTS

| | | | |
|---|---|---|---|
| 2,632,040 A | 3/1953 | Rabinow | |
| 2,827,594 A | 3/1958 | Rabinow | |
| 4,692,798 A | 9/1987 | Seko et al. | |
| 4,862,037 A | 8/1989 | Farber et al. | |
| 4,891,559 A | 1/1990 | Matsumoto et al. | |
| 4,930,742 A | * 6/1990 | Schofield et al. | 248/475.1 |
| 4,967,319 A | 10/1990 | Seko | |
| 5,036,437 A | 7/1991 | Macks | |
| 5,124,549 A | 6/1992 | Michaels et al. | |
| 5,235,178 A | 8/1993 | Hegyi | |
| 5,329,206 A | 7/1994 | Slotkowski et al. | |

(List continued on next page.)

FOREIGN PATENT DOCUMENTS

| | | |
|---|---|---|
| DE | 2946561 | 5/1981 |
| FR | 2641237 | 7/1990 |
| FR | 2726144 | 4/1996 |
| JP | 8-166221 | 6/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Christopher M. Kormanyos, SAE Paper No. 980003, pp. 13–18. No date.

Franz–Josef Kalze, SAE Paper No. 980005, pp. 23–26. No date.

J.P. Löwenau et al., SAE Paper No. 980007, pp. 33–38. No date.

Tohru Simizu et al., SAE Paper No. 980322, pp. 113–117. No date.

*Primary Examiner*—Yonel Beaulieu
(74) *Attorney, Agent, or Firm*—Price, Heneveld, Cooper, DeWitt & Litton (57) ABSTRACT

An imaging system of the invention includes an image array sensor including a plurality of pixels. Each of the pixels generate a signal indicative of the amount of light received on the pixel. The imaging system further includes an analog to digital converter for quantizing the signals from the pixels into a digital value. The system further includes a memory including a plurality of allocated storage locations for storing the digital values from the analog to digital converter. The number of allocated storage locations in the memory is less than the number of pixels in the image array sensor. According to another embodiment, an imaging device includes an image sensor having a plurality pixels arranged in an array; and a multi-layer interference filter disposed over said pixel array, said multi-layer interference filter being patterned so as to provide filters of different colors to neighboring pixels or groups of pixels.

45 Claims, 7 Drawing Sheets

U.S. PATENT DOCUMENTS

| | | |
|---|---|---|
| 5,416,318 A | 5/1995 | Hegyi |
| 5,426,294 A | 6/1995 | Kobayashi et al. |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,614,788 A | 3/1997 | Mullins et al. |
| 5,660,454 A | 8/1997 | Mori et al. |
| 5,666,028 A | 9/1997 | Bechtel et al. |
| 5,715,093 A | 2/1998 | Schierbeek et al. |
| 5,796,094 A | 8/1998 | Schofield et al. |
| 5,837,994 A | 11/1998 | Stam et al. |
| 5,841,126 A | 11/1998 | Fossum et al. |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,097,023 A | 8/2000 | Schofield et al. |
| 6,102,546 A * | 8/2000 | Carter ........................ 359/604 |
| 6,144,158 A | 11/2000 | Beam ......................... 315/82 |

* cited by examiner

IMAGE PROCESSING SYSTEM TO CONTROL VEHICLE HEADLAMPS OR OTHER VEHICLE EQUIPMENT

BACKGROUND OF THE INVENTION

The present invention generally relates to image processing systems, and more particularly, to image processing systems used to control vehicle equipment, such as vehicle headlamps, windshield wipers, etc.

Recently, many vehicular control accessories utilizing image processing systems have been proposed. For example, U.S. Pat. No. 5,837,994 entitled "Control System to Automatically Dim Vehicle Head Lamps," commonly assigned with the present invention and hereby incorporated by reference, discloses a control system which utilizes an image sensor and a processor to detect the headlamps of other vehicles at night and automatically control the state of the high beam headlamps of a vehicle. Another example of an image processing system to control vehicle equipment is given in U.S. Pat. No. 5,923,027 entitled "Moisture Sensor and Windshield Fog Detector," also commonly assigned with the present invention and hereby incorporated by reference. This patent discloses an image processing system, which acquires images of a vehicle windshield in order to detect the presence of rain or fog.

In each of these systems, as well as several other disclosed automotive image processing systems (see, for example, U.S. Pat. Nos. 5,765,116, 5,675,489, and 5,660,454 and PCT Published Patent Application No. WO 00/53465), images are acquired by an image sensor and stored into a memory in their entirety for subsequent processing. While technically very convenient, the use of this amount of image memory presents problems when adapting the system for commercial use, especially in the highly cost-sensitive automotive market. Most low cost microcontrollers or digital signal processors (DSPs) suitable for these types of applications are equipped with only a few hundred bytes to a few kilobytes of random access memory (RAM) into which the images can be stored. The processing core of many microcontrollers is typically available with a variety of RAM configurations, with the price increasing as the amount of memory increases. Therefore, it is advantageous to use a microcontroller with the least amount of RAM possible. The use of a small amount of RAM in prior art systems limits the size of the image, which can be stored and thus greatly limits the resolution.

A common off-the-shelf image sensor may have 352×288 pixels, known as the CIF format. Storing an entire image from this sensor requires approximately 100 kilobytes of RAM—far more than is typically available on a low cost microcontroller. Some microcontrollers have the ability to increase the amount of RAM available by the addition of an external memory chip. These microcontrollers must have an external memory bus, increasing the pin count and thus the cost and complexity of the microcontroller and the circuit board to which it is attached. The cost of the external memory itself must also be considered, and despite rapid memory price declines, this cost is anticipated to remain significant for some time to come. Finally, if an image must be transferred to memory before it can be processed, the total time required to acquire and analyze an image will be greater than if the analysis could occur simultaneously with the acquisition.

What is needed is a low cost image processing system to control automotive equipment which is capable of analyzing images without first storing them to memory, thus reducing the total amount of memory required in the system.

SUMMARY OF THE PRESENT INVENTION

The present invention solves the problem of the prior art by providing an image processing system, which does not require a memory with enough storage locations to store the digital grayscale value of every pixel in the image. The system contains an image sensor array containing a plurality of pixels, each of which is configured to provide an output indicative of the amount of light received by the pixel over the exposure time. The system also provides an analog-to-digital (A/D) converter to quantize the signal from the pixel into a digital grayscale value. The system also provides a processor in communication with the image sensor and A/D converter to analyze the images acquired by the image processor and control vehicle equipment based upon the results of processing the images. Finally, the system contains a memory for storing the grayscale value of some of the pixels and for storing other data used by the processor. By providing an image processing system with less available memory than is needed to store all pixels, the cost and the complexity of the image processing system can be reduced.

According to one aspect of the present invention, the amount of memory required is reduced by acquiring and analyzing only a portion of the image at a given time. This may be accomplished by acquiring a single row of pixels at a time or by acquiring a subwindow of pixels, which is a subset of the window containing all the pixels.

In another aspect of the present invention, a digital image processing filter is implemented by only storing a most recent group of pixels and performing the filter algorithm on this group of pixels. The most recent group of pixels may be, for example, the last few rows of the image received. The system performs the filter algorithm on the last few acquired rows and discards the oldest row as a new row is acquired.

In another aspect of the invention, some of the pixel values received by the processor are discarded as they are received and only a subset of the values is stored in the memory. Pixels may be discarded at a uniform rate throughout the image or at a non-uniform rate. For example, pixels may be discarded at a high rate near the periphery of the image and at a low or zero rate near the center of the image to provide a greater resolution near the center of the image.

In another aspect of the invention, the values of adjacent pixels may be averaged with one another and a single value stored in memory representing the average of several adjacent pixels. The number of pixels averaged with each other may be uniform throughout the image or may be non-uniform. Many pixels may be averaged with each other near the periphery of the image and few or zero pixels may be averaged with each other near the center of the image to provide a greater resolution near the center of the image.

In another aspect of the invention, objects identified in the image may be extracted from the image and stored as the image is being acquired. For example, the present invention may be used to identify headlamps of oncoming vehicles in order to determine the high beam state of the headlamps of the controlled vehicle. The present invention can identify the presence of an oncoming headlamp in the image as it is being acquired and store various information about the headlamp in an object list.

In another aspect of the present invention, the image data may be compressed as it is being acquired. This compression is accomplished by many ways including reducing the number of quantization levels (bit depth) of a pixel value as it is being received. Reducing bit depth of the image may be performed either uniformly or non-uniformly across the image and by requantizing either linearly or non-linearly. This aspect of the present invention is particularly useful for reducing data rate when the camera is positioned away from the processor.

In another aspect of the present invention, image data is reduced by storing segments of connected pixels, which together make up an object of interest. For example, a string of connected pixels in one row of an image, all with grayscale values above a threshold, may be stored as one object. Rather than storing the grayscale values of each pixel, only the starting and ending pixels and the cumulative grayscale value of all the pixels are stored. In a color implementation, the average color of the segment may be stored. Finally, two dimensional groups of objects may also be stored. This aspect is particularly useful for greatly reducing the memory requirements and transmitting image data with the least possible overhead. The processing to reduce the image to a list of segments may be contained in the image sensor itself, in a companion processor (ASIC, microcontroller, DSP or the like) near the image sensor, or in the main processor.

In another aspect of the present invention a color image sensor is used to detect color information about an object in the scene. In this embodiment, multi-layer thin film interference filters are placed over each pixel in a checkerboard or mosaic pattern such that adjacent pixels are exposed to different spectral bands of light. The use of multi-layer thin film interference filters allows the implementation of a color imaging system in an automotive environment. Typical polymer color filters would be degraded by direct focusing of the sun onto the array which will occur when the vehicle is traveling or is parked such that the camera is in direct view of the sun.

To achieve these and other aspects and advantages, the imaging system of the present invention comprises an image array sensor including a plurality of pixels, each of the pixels is operable to generate a signal indicative of the amount of light received on the pixel; an analog to digital converter for quantizing the signals from the pixels into a digital value; and a memory including a plurality of allocated storage locations for storing the digital values from the analog to digital converter, wherein the number of storage locations in the allocated memory is less than the number of pixels in the image array sensor.

According to another embodiment of the present invention, a control system is provided to control the headlamps of a vehicle. The control system comprises: an image array sensor including a plurality of pixels, each of the pixels is operable to generate a signal indicative of the amount of light received on the pixel; an optical system configured to image the scene forward of the controlled vehicle onto the image array sensor; an analog to digital converter for quantizing the signals from the pixels into a digital value; and a control circuit for processing the image of the scene obtained from the imaging system and for controlling the brightness of the headlamps in response to objects detected in the processed scene. The control circuit including a memory including a plurality of allocated storage locations for storing the digital values from the analog to digital converter, wherein the number of allocated storage locations in the memory is less than the number of pixels in the image array sensor.

According to yet another embodiment of the present invention, a control system is provided to control the headlamps of a vehicle. The control system comprises: an image array sensor including a plurality of pixels, each of the pixels is operable to generate a signal indicative of the amount of light received on the pixel; an optical system configured to image the scene forward of the controlled vehicle onto the image array sensor; and a control circuit for processing the image of the scene obtained from the imaging system and for controlling the brightness of the headlamps in response to objects detected in the processed scene, wherein the control circuit generates a segment list identifying segments of adjacent ones of the pixels that generate a signal having a grayscale value above a threshold as the signals are received from the pixels.

According to another embodiment of the present invention, an inside rearview mirror assembly for a vehicle comprises: a mirror mount adapted to be mounted inside the vehicle in a location proximate to or on the front windshield of the vehicle; a mirror bezel coupled to the mirror mount; a mirror mounted in the mirror bezel; an imaging system mounted to the mirror mount and configured to image the scene forward of the vehicle; and a control circuit electrically coupled to the imaging system for processing the image of the scene obtained from the image array sensor and for performing predetermined function in response to objects detected in the processed scene, wherein at least a portion of the control circuit is mounted to the mirror mount.

According to still another embodiment of the present invention, an imaging system for a vehicle is provided that comprises: an image array sensor; an optical system configured to image the scene forward of the controlled vehicle onto the image array sensor; and a control circuit coupled to the image array sensor for processing the image of the scene obtained from the image array sensor to control the vehicle headlamps in response to objects detected in the processed scene, the control circuit further processes the scene obtained from the image array sensor to perform at least one of the following functions: (a) to generate a collision avoidance warning; (b) to control the speed of the vehicle; and (c) to generate a lane departure indication signal.

These and other features, advantages, and objects of the present invention will be further understood and appreciated by those skilled in the art by reference to the following specification, claims, and appended drawings.

DETAILED DESCRIPTION OF THE PRESENT INVENTION

Figure 1:
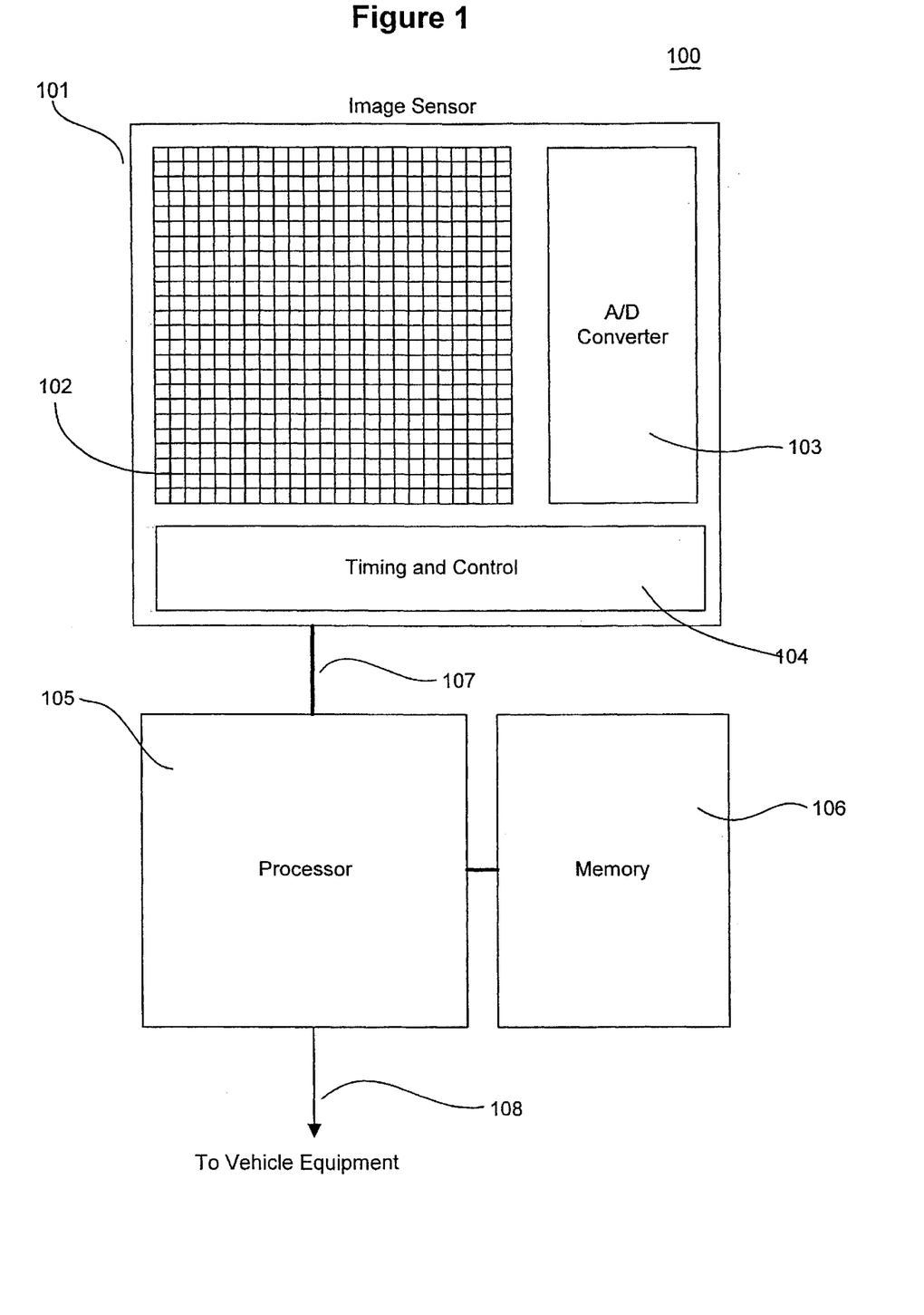
FIG. 1 is an electrical circuit diagram in block form showing the image processing system 100 of the present invention.

Referring to FIG. 1, the image processing system 100 of the present invention includes at least one image array sensor 101. The image array sensor may be of a variety of types such as a CMOS active pixel sensor, a Charge Coupled Device (CCD), or any other type of electronic image sensor capable of sensing light in the visible, UV, near-IR or far-IR spectral bands. The image sensor 101 contains an array of pixels 102 onto which an image of a scene is formed by a lens. The pixels are exposed to light over for a predetermined exposure time after which a voltage signal is present on the pixel indicative of the amount of light received. This voltage is then quantitized by the A/D converter 103 resulting in a digital grayscale value indicative of the amount of light received on the pixel. A/D converters for this purpose typically quantize the pixel signals into 256 levels or 8 bits. However, different bit depths are frequently used and applicable to the present invention. Timing and control circuitry 104 provides all the signaling and timing necessary to operate the image sensor and transmit grayscale values to processor 105. An example of timing and control circuitry suitable for the present invention is given in U.S. Pat. No. 5,990,469 entitled "Control Circuit for Image Array Sensors" to Bechtel et al., commonly assigned with the present invention and hereby incorporated by reference.

Images acquired by image sensor 101 are transmitted to the processor 105 over bus 107. The processor 105 may be of a variety of types such as a microcontroller, digital signal processor (DSP), field programmable gate array (FPGA), application specific integrated circuit (ASIC), or the like. An appropriate processor for the implementation of several aspects of the present invention is a microcontroller of the MCS912 family available from Motorola. The bus 107 can also be of a variety of types, for example bus 107 may be a three wire serial interface which communicates image exposure instructions from processor 105 to the timing and control circuit 104 and communicates image data from image sensor 101 to processor 105, such as is described in the '469 patent. Alternatively, bus 107 may be a parallel bus for communicating image data with image control parameters communicated on the same lines or separate signal lines. Bus 107 could also carry analog signals such as the common NTSC video signal. Bus 107 could be implemented by using a wireless network, by using a MOST bus, using an IEEE-1394 bus, a CAN bus, or by using a bus conforming to the AMI-C specification. In this case, the conversion from analog to digital signals would occur on the processor side of bus 107.

In prior art systems, images received by processor 105 would be stored to memory 106 in their entirety. In the present invention, image data may be processed as the image data is being received by processor 105 and the results of this processing may be stored in memory 106. Memory 106 may be integral to processor 105 or external to the processor. The present invention provides the advantage of performing many of the analysis tasks necessary to control vehicle equipment utilizing the amounts of memory which are typically integrated with many common microcontrollers and DSPs.

Image sensor 101, A/D converter 103, and timing and control circuitry 104 are preferably made integral on the same monolithic device. Optionally, processor 105 and/or memory 106 may also be made integral with image sensor 101, A/D converter 103, and timing and control circuit 104. Alternatively, any or all of the above components may be made as separate devices or any of the above components may be made integral with any other component as is convenient for the specific implementation of the invention. Finally, components other than those listed or multiple instances of the components listed either may be present as discrete components or combined integrally with other components.

Figure 2:
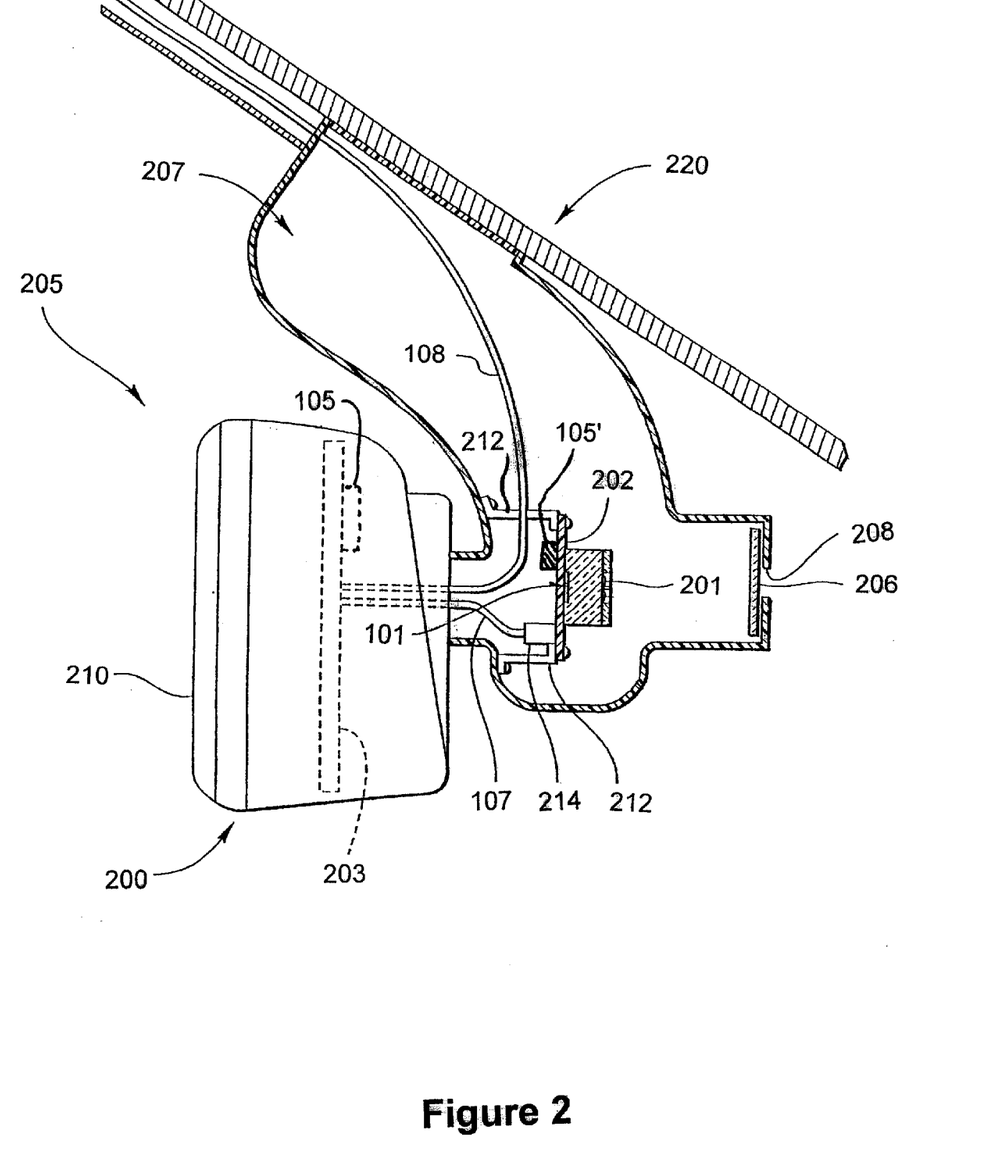
FIG. 2 is a cross-sectional view of a rearview mirror assembly in which the image processing system of the present invention may be implemented.

The image processing system 100 of the present invention can be advantageously integrated into a rearview mirror assembly 200 as illustrated in FIG. 2, wherein the image sensor 101 is integrated into an automatic dimming electrochromic (EC) mirror subassembly 205, or other variable reflectance mirror assembly. This location provides an unobstructed forward view of a scene forward of the vehicle through a region of the windshield 220 of the vehicle that is typically cleaned by the vehicle's windshield wipers (not shown). Additionally, mounting the image sensor in the mirror assembly permits sharing of circuitry such as the power supply, microcontroller, and light sensors. More specifically, the same ambient light sensor may be used to provide an ambient light measurement for both the auto-dimming mirror function and the headlamp control function.

This embodiment is useful for automatic control of vehicle headlights, for imaging a region of a windshield 220 to detect rain, or any other application where a forward view of a vehicle is useful to control vehicle equipment.

Referring to FIG. 2, image sensor 101 is mounted within a rearview mirror mount 207, which is mounted to the vehicle windshield 220. The rearview mirror mount 207 provides an opaque enclosure for image sensor 101. An infrared filter 206 may be mounted over a hole 208 in the rearview mirror mount 207, as is shown. Light from the scene to be imaged passes through hole 208 and infrared filter 206 and impinges upon a lens 201. Lens 201 forms an image of the forward scene onto image array 101. Image sensor 101 is mounted onto a camera circuit board 202. Camera circuit board 202 is mounted to rearview mirror mount 207 using mounting brackets 212. The mounting brackets may be implemented using any suitable construction, such as metal brackets; plastic brackets, which can be formed either integrally with housing 207 or as separate components; mechanical fasteners that engage camera circuit board 202; or the like. Separate brackets can be attached using an adhesive, metal fasteners, or other mechanical fastening means. Image sensor 101 is thus attached to, and held stationary by, rearview mirror mount 207, which is securely attached to the vehicle windshield 220 or the vehicle roof by conventional means.

As also shown in FIG. 2, a mirror circuit board 203 may be provided in mirror housing body 210 (i.e., the mirror bezel) on which processor circuit 105 may be mounted. Processor 105 and image sensor 101 are electrically coupled by a bus 107, which is attached to camera circuit board 202 by means of a connector 214.

Bus 107 may be constructed as a multi-wire cable, which provides bus signals as well as power, ground, and clock signals to camera circuit board 202. This cable may be formed from conventional multi-conductor wire, shielded cable, or as a flex circuit; the last of which may be especially advantageous if bus 107 is a parallel bus requiring multiple connections. Processor 105 may alternatively be positioned on camera circuit board 202 (or integrated into the image sensor) and another cable could be connected to mirror circuit board 203 if mirror assembly 200 contains additional electronic functions, such as electrochromic auto dimming mirror, a compass, etc.

Another method to reduce the complexity of the bus cable 107, particularly if the bus 107 is a parallel bus, is to position another processor 105' or logic circuit on camera circuit board 202 while main processor 105 is remotely located such as in the mirror body or elsewhere in the vehicle. Communication between the image sensor, second processor, and main processor may be serial or parallel. In a preferred embodiment, communication between the image sensor and the second processor 105' is parallel and communication between the two processors is serial. Optionally, second processor 105' may perform some of the processing functions described hereinafter. The use of a second processor may facilitate the use of an off-the-shelf image sensor which otherwise may have too many control and data signals to conveniently communicate over a cable between the body 210 and mount 207 of a mirror assembly 200.

Headlamp control and rain sensing may also be accomplished using two separate cameras in the mirror mount but using only one processor. In this case, both cameras could share the same bus to communicate with the main processor. This allows substantially different optics optimized for each application to be used with each image sensor.

Information determined by processor 105 or decisions made by processor 105 may be communicated with vehicle equipment over a vehicle wiring harness 108. Vehicle wiring harness 108 may be implemented in a variety of ways including a dedicated point-to-point signal to the controlled vehicle equipment or by the use of a multiplexed vehicle bus such as the CAN bus or J1850 bus. Such a vehicle wiring harness 108 may be used as a power and communication link with vehicle components such as headlamps, windshield wipers, and other displays or warning or control subsystems within the vehicle.

In an embodiment of the present invention, the required allocated memory necessary to process images from image sensor 101 is reduced by analyzing only particular regions or windows of the image at a time. By acquiring only a particular subwindow at a given time, only enough allocated memory to store that particular subwindow is required. Each subwindow is acquired and processed individually until the entire image area, or whatever subset of the entire area is desired, is processed. The subwindow may be of a variety of sizes depending on the application. The subwindow may be a single or row, a single column, or any rectangular or square region of pixels.

The advantages of processing select subwindows are many. For example, different processing parameters may be applied to different regions of the image by varying the process parameters with each subwindow used. Different exposures may be used for different subwindows. This is particularly important when imaging a scene during the day, as is required for a rain sensor. Normally a high dynamic range image sensor is necessary to properly expose regions of the scene above and below the horizon since the brightness of the scene above the horizon is typically substantially higher than that below the horizon. However, by using different subwindows for regions above and below the horizon, different exposures can be used allowing each region to be properly exposed.

Several imaging processing tasks involve the use of digital filters to quantify frequency components of an image, detect edges, or other similar functions. These filters are typically implemented by use of a kernel—a matrix of coefficients to multiply pixels in a region surrounding the current pixel in order to extract information about the pixel. This can be described mathematically by the following kernel table and expression:

| A | B | C |
|---|---|---|
| D | E | F |
| G | H | I |

A pixel grayscale value is represented by Val(x,y), where x and y are the coordinates of the current pixel. The value of the pixel in a new image created by applying the filter kernel to an existing image is:

$$A*\text{Val}(x-1,y-1)+B*\text{Val}(x,y-1)+C*\text{Val}(x+1,y-1)+D*\text{Val}(x-1,y)+$$
$$E*\text{Val}(x,y)+F*\text{Val}(x+1,y)+G*\text{Val}(x-1,y+1)+H*\text{Val}(x,y+1)+$$
$$I*\text{Val}(x+1,y+1)$$

As an example, a high pass filter can be implemented by setting the coefficients A, C, G & I to 0; D, B, F & H to −1; and E to 4. Other filters, which can be implemented with kernels using more complex procedures, include edge filters such as the Sobel or Roberts edge filters. Finally, the use of a 3×3 kernel is only exemplary. Larger kernels or non-square kernels are also applicable.

In many applications of the present invention, it is not actually necessary to create a new image by using the filter but rather to quantify the total high or low frequency components of an image or subwindow of an image. Alternatively it may be useful to detect edges in an image and store only their location or the number of edges rather than to create a new image. In this case, it is possible to reduce the memory required to process images by performing the filtering as the image is received. Memory is needed only to store one or a few rows of the image at a time. If a 3×3 kernel is used, three rows worth of memory can be used to store pixel values while the kernel is being executed. After the kernel has been executed across the second row of the image, a fourth row can be received and the first row can be discarded. The result of the kernel being applied to the second row can be tallied in another memory location. This result may be a sun of all the results of the kernel, a location of high or low frequency components, edge locations, or the like. This process continues over the entire image while it is being received from imager 101.

In another embodiment, only select pixels are stored into memory 106 as the image is being received. For example, in an automatic headlamp control system, it may not be necessary to have a very high resolution image. If a standard off-the-shelf image sensor is being used, such as a CIF format sensor, there may far more pixels than are required to produce an adequately functioning system. Rather than increase the cost of the system by including adequate memory to store the entire image, the memory requirements may be reduced by discarding some of the pixels as they are received. In a simple implementation, this may involve simply storing only the $n^{th}$ pixel received, where n is a number dependent on the resolution of the sensor and the number of pixels actually required to achieve adequate performance. With a CIF sensor n may be, for example, 3. Alternatively, n pixels may be averaged to produce a smaller image. This can occur in both vertical and horizontal directions and n×n pixels may be averaged into a single value, In another embodiment, n is not a uniform number throughout the image. In an automatic headlamp control system, it is useful to have a greater resolution near the center of the image corresponding to the direction where a vehicle's high beams are most intense. This enables more accurate detection of faint and small light sources in this central zone. Farther off axis, only bright and large objects may need to be detected. To accomplish a variable resolution image, the value of n is increased off-axis and reduced near the center. Off-axis pixels may be averaged or skipped. Near the center, n may be 1 and every pixel may be stored.

According to one embodiment of the present invention, the image processing system may be used for automatic headlamp control. Automatic headlamp control systems typically are used to change the beam illumination pattern produced by the vehicle headlamps. The illumination pattern may be varied in response to detected light sources to the front of the vehicle, by varying the aim, brightness, and/or focus of the headlamps and/or selectively activating different combinations of exterior lights functioning as headlamps. Ideally, the system can distinguish between headlamps of oncoming vehicles, tail lamps of forward vehicles, and non-vehicle light sources. Automatic headlamp control systems are described in U.S. Pat. Nos. 5,837,994, 6,008,486, and 6,049,171; U.S. patent application Ser. No. 09/528,389; and U.S. patent application Ser. No. 09/800,460, entitled "System for Controlling Exterior Vehicle Lights," filed on Mar. 5, 2001, all to Stain et at., commonly assigned with the present invention, and hereby incorporated by reference. In these systems, two image subwindows are acquired through two different colored lenses. Each subwindow images the same scene, but through different color filters. Light sources detected in one subwindow are compared to light sources detected in the other subwindow to determine the relative ratio of each color light in the object. This information is used to distinguish the red light from tail lamps from the white light of headlamps.

Figure 3:
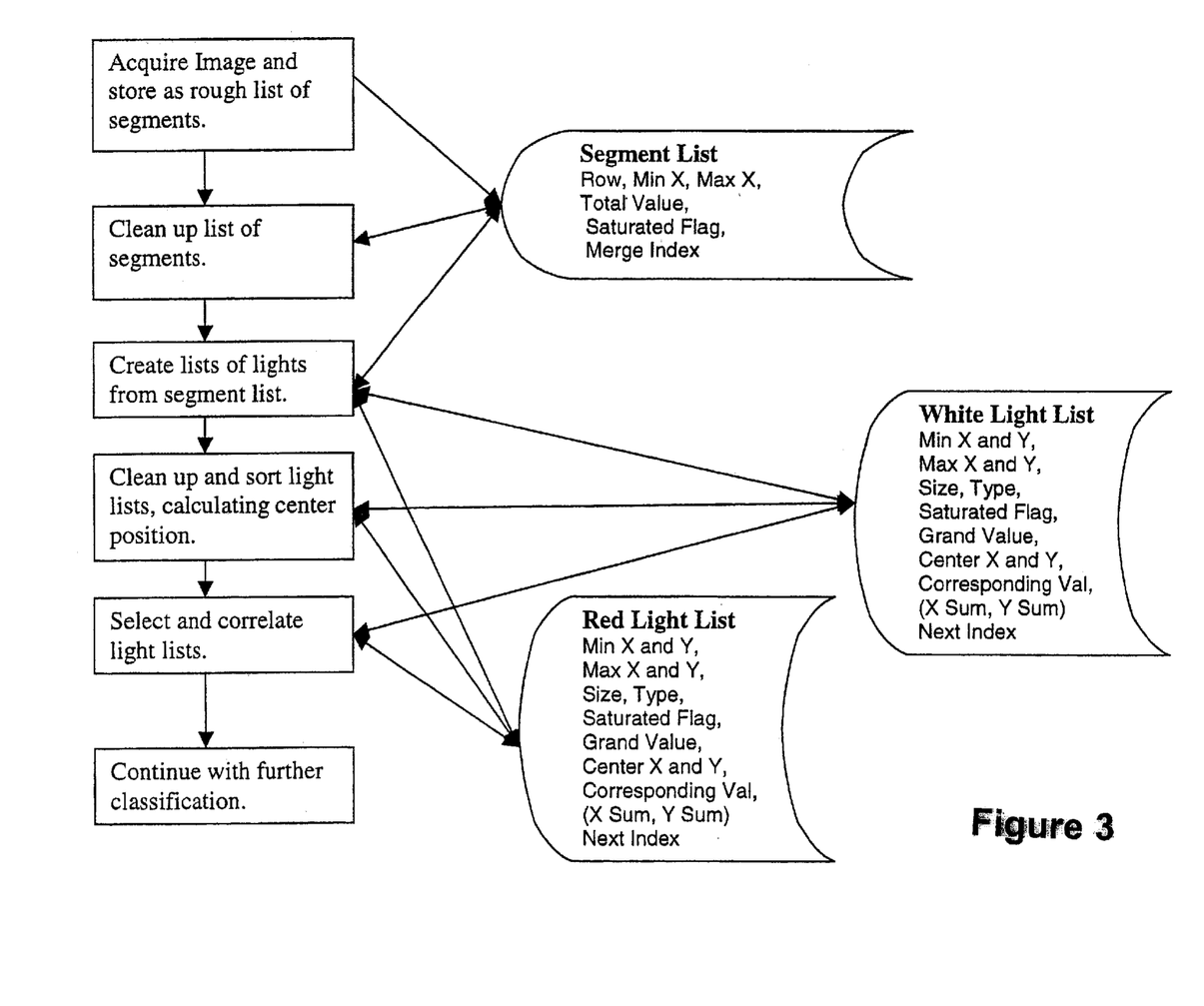
FIG. 3 is a flow chart illustrating the image reading and processing portion of the first embodiment that develops the segment list.

Using the inventive image processing system for headlamp control, light sources are extracted from an image as the image is received. A light source within an image may be defined as a set of connected pixels, all of which have grayscale values above a threshold. Connected pixels refer to pixels which are adjacent to one another on one side or, optionally, diagonally. An algorithm defining a method for detecting light sources within an image as each row of the image is being received by the processor is illustrated in FIGS. 3 and 4 below. To execute this algorithm, three items are stored in memory. First, a segment list is stored containing information regarding segments of the image row being received having pixels exceeding a predetermined threshold (i.e., connected pixels within a row). As shown in FIG. 3, a segment list may include the row number and the minimum X (Min X) and maximum X (Max X) values, which represent the beginning and ending columns of the identified segment within the row. The segment list may also include a total value for the quantitized light levels output from all of the pixels in each segment, a saturation flag which indicates whether any of the pixels exceeded a saturation limit, and a merge index. Also stored in memory are red and white light lists. As also shown in FIG. 3, the red and white light lists respectively may include: (1) the minimum X and Y and maximum X and Y values representing the bounds in terms of rows and columns of each detected white or red light source; (2) the size (i.e., number of pixels) of each light source; (3) the type of each light source; (4) the saturation flag; (5) the total gray value of each light source; (6) the center X and Y values of each light source; (7) the total gray value of each corresponding light source; (8) the X and Y sums; and (9) the next index. As will be described further below, the segment list may be constructed as the image is read from the image sensor. This eliminates the need to store any of the image data directly obtained from the image sensor. Thus, as the image is acquired from the image sensor, a rough list of segments is stored in the segment list. Then, the list of segments is cleaned up by passing through the list to adjust and complete all values in the list. This may include, for example, making adjustments for any faulty pixels that are known or discovered to exist in the image sensor array. It may also include adjusting values for row and column numbers at edges of columns.

The segment list is then traversed to combine segments directly above or below each other into a list of lights, each showing the bounding rectangle coordinates, total pixel value, and size. The sum of X and Y coordinates is also computed. This process may involve merging lights that are adjacent as well as segment information.

The object or segment extraction (i.e., generating the segment list and/or object lists) may be performed by either a main processor 105 or in another processor 105' located near the image sensor (or integrated into the image sensor). Extracting objects or segments near image sensor 101 minimizes the data which must be transmitted over a cable (107) between mirror mount 207 and mirror body 210. Conceivably, a camera with an image sensor could be located in a remote part of the vehicle and object or segment data could be transmitted via a bus. In a preferred embodiment, a logic component (i.e., processor 105') on or near the image sensor computes the start, stop, and total gray value of a segment of illuminated pixels in a row. These three parameters are sent from the mirror mount to the mirror body. The processor 105 in the mirror body 210 combines these segments with other segments to identify two dimensional objects and then applies rules to determine the proper action. In a color image sensor, average color, or the total red, green, and blue (RGB) values are sent to the main processor 105 along with the start and stop column index.

The lists are then traversed again, computing the center coordinates from the X and Y sums and eliminating red lights below various thresholds. The red lights are then sorted by their center coordinates while the white lights are sorted by their minimum X and Y values. The memory used for the X and Y sums can now be used for other purposes, such as storing the corresponding white value and center coordinates.

The resulting red list is traversed to locate a white light with a bounding rectangle containing the red light's center position. This is done to determine whether or not the light source that is detected is a headlight or a tail light.

The light levels and sizes in the resulting list can then be compared with various criteria to further categorize the light sources.

Figure 4A:
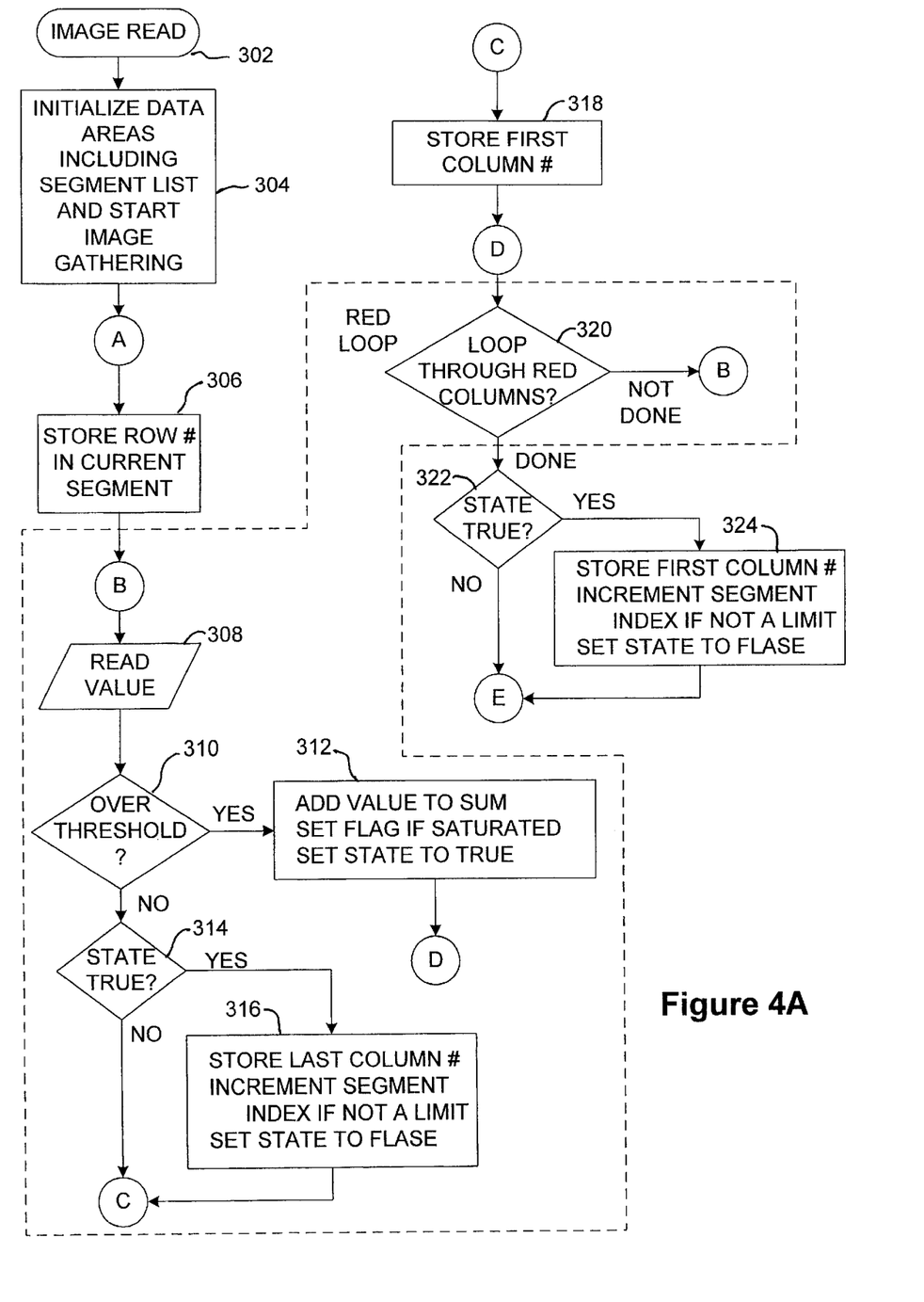
FIGS. 4A and 4B are a flow chart illustrating the image reception and processing phase by which an object list is created in accordance with a first embodiment of the present invention.
Figure 4B:
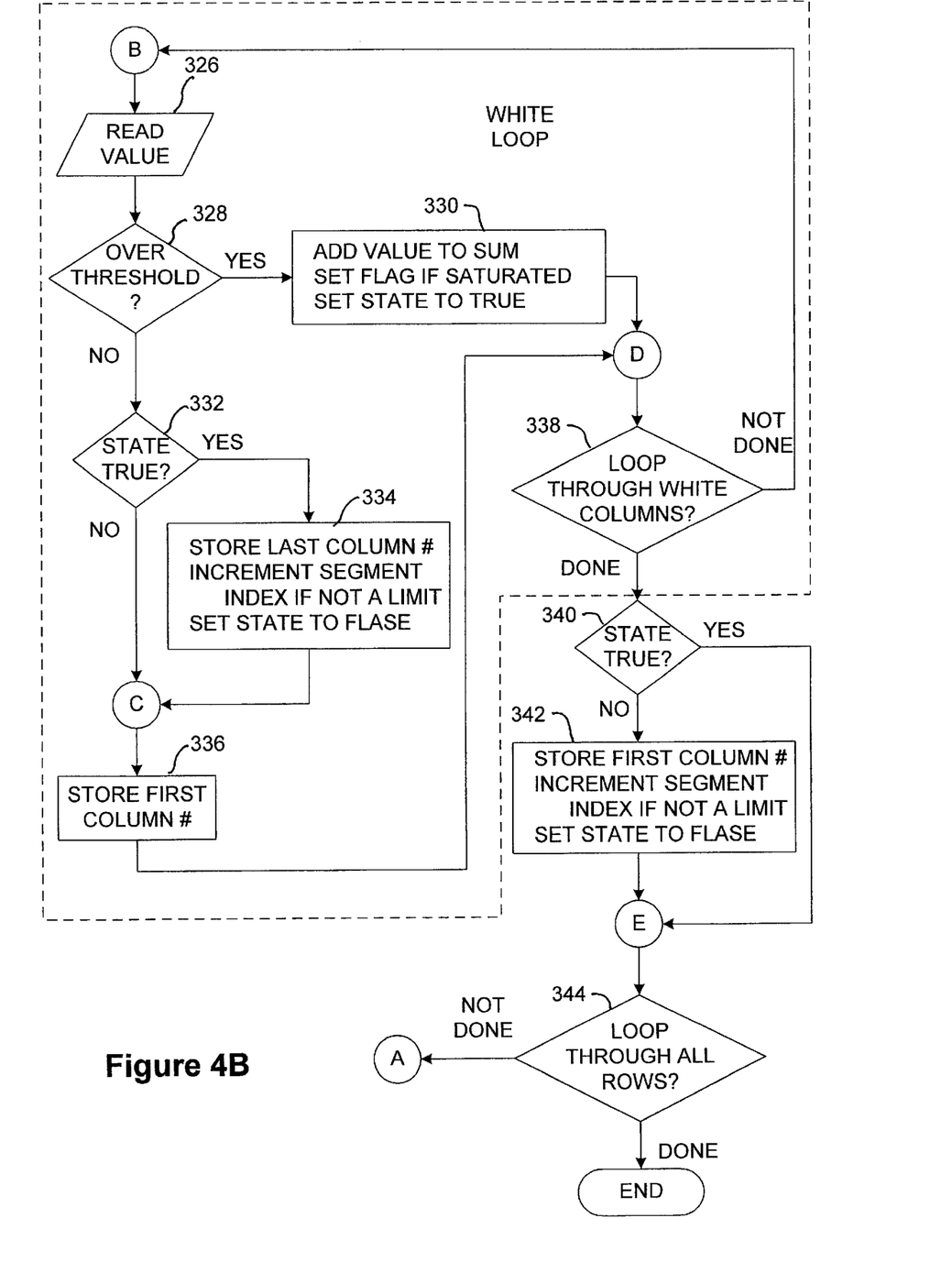

Having generally described the method as depicted in FIG. 3, reference is made to FIGS. 4A and 4B, which describe the algorithm in more detail. The processing proceeds for the image reading with step 304 in which data areas including the segment list are initialized and the commands to acquire an image are sent to the imager. The data that is initialized is discussed further below. The process then proceeds into what is referred to as a "row loop." The body of this loop processes each row of image data read from image sensor array 101. Thus, the first step is to store the row number of image data in the current segment as depicted in step 306. Next, the routine enters a nested loop referred to in FIG. 4A as the "red loop." In this loop, each pixel value in the row is read that is within the subwindow onto which the image is projected through a red or clear filter. A second subwindow is also present in the row onto which the same image is projected through a cyan filter.

The rows may thus be effectively divided in two, with the first half corresponding to red lights and the second half corresponding to white lights. It is from this red loop that the red light list is generated. This process begins with step 308, where the first pixel value is read. Processor 105 then determines in step 310 whether the grayscale value of the pixel read in step 308 exceeds a threshold. If the grayscale value of the pixel exceeds a threshold, the routine proceeds to step 312 where the grayscale value is added to a sum contained in the current segment. The value of the sum is initialized in step 304 to be zero for each segment. Also in step 312, processor 105 determines if the grayscale value of the pixel exceeded a saturation limit in which case a saturation flag is set for the current segment in step 312. Processor 105 then sets the "state" to "true" indicating that a segment has been identified. The "state" is initialized in step 304 as "false." The procedure then advances to step 320 where processor 105 determines whether all columns of pixels within the row subwindow have been read. Assuming that not all the pixels have been read, the process returns to step 308 where the next pixel value is read.

If processor 105 determines in step 310 that the grayscale value from a pixel is not above the threshold, the processor determines in step 314 whether the state is true (i.e., whether or not the prior pixel was part of an identified segment). If the state is true, the processor proceeds to step 316 and where it sets the last column number as the maximum X value in the current segment.

Then in step 316, processor 105 increments the segment index to point to a subsequent segment (i.e., a new "current segment"), testing to assure that the maximum number of segments have not already been stored. The state is also set to False. After step 316 or if processor 105 determined in step 314 that the state is not true, the process flows to step 318 which stores the current column number as the first column in the current segment. Note that the column number stored as the first column is actually one less than the actual first column. Later processing steps take this into account. After step 318, the process flows to step 320 where it is determined whether all of the red subwindow columns have been processed for the row.

Once all of the red subwindow columns have been processed for the row, control passes to step 322. In step 322, the state is tested. If True (i.e., the last pixel of the row contained a value over the threshold), the processor proceeds to step 324. If False, the processing proceeds with step 326.

In step 324, processor 105 sets the first column to point to the first pixel of the white subwindow portion of image sensor array 101, which are treated as extra columns. Also, the segment index is incremented if it is not already at the limit and the state is set to "false."

The process then proceeds through a white loop-nested subroutine where the second half of the row corresponding to the white subwindow is read and processed. This loop is similar in nature to the red loop with steps 326–342 corresponding identically to steps 308–324. Because the same image is imaged onto the two different subwindows of image sensor 101, light from light sources outside the vehicle that passes through both filters would be detected in the same regions and patterns for the first and second halves of the processed row. In a preferred embodiment, the first filter is a red filter, which only allows red light to pass while the second filter is a cyan filter, which only allows light having a cyan components to pass through. Thus, a vehicle's tail lights may appear on the first half of the row in the red subwindow and would not appear in the second subwindow, while light from a vehicle's headlamps would be detected in both subwindows since such light typically exhibits a spectrum with light components in both the red and cyan portions of the spectrum. It will be appreciated, however, that a combination of red and clear filters could be used in place of the combination of red and cyan filters.

After reading each pixel in the second half of the row corresponding to the white loop, and the cleanup steps in steps 340 and 342, processor 105 proceeds to checking in step 344 whether all rows of image sensor 101 have been processed. If they have not all been processed, the procedure loops back to step 306 to process each subsequent row in a similar manner. In this sequence, the segment list is constructed.

As noted above, once the segment list has been constructed, the white light list and the red light list are formulated based upon the information in the segment list. Specifically, segments in the segment list in adjacent rows and sharing common columns may be merged to define either a white or red light that is identified in one of the red or white light lists. Based upon the information in the red and white light lists, processor 105 controls the high or low beam state of the vehicle's headlamps.

Figure 5A:
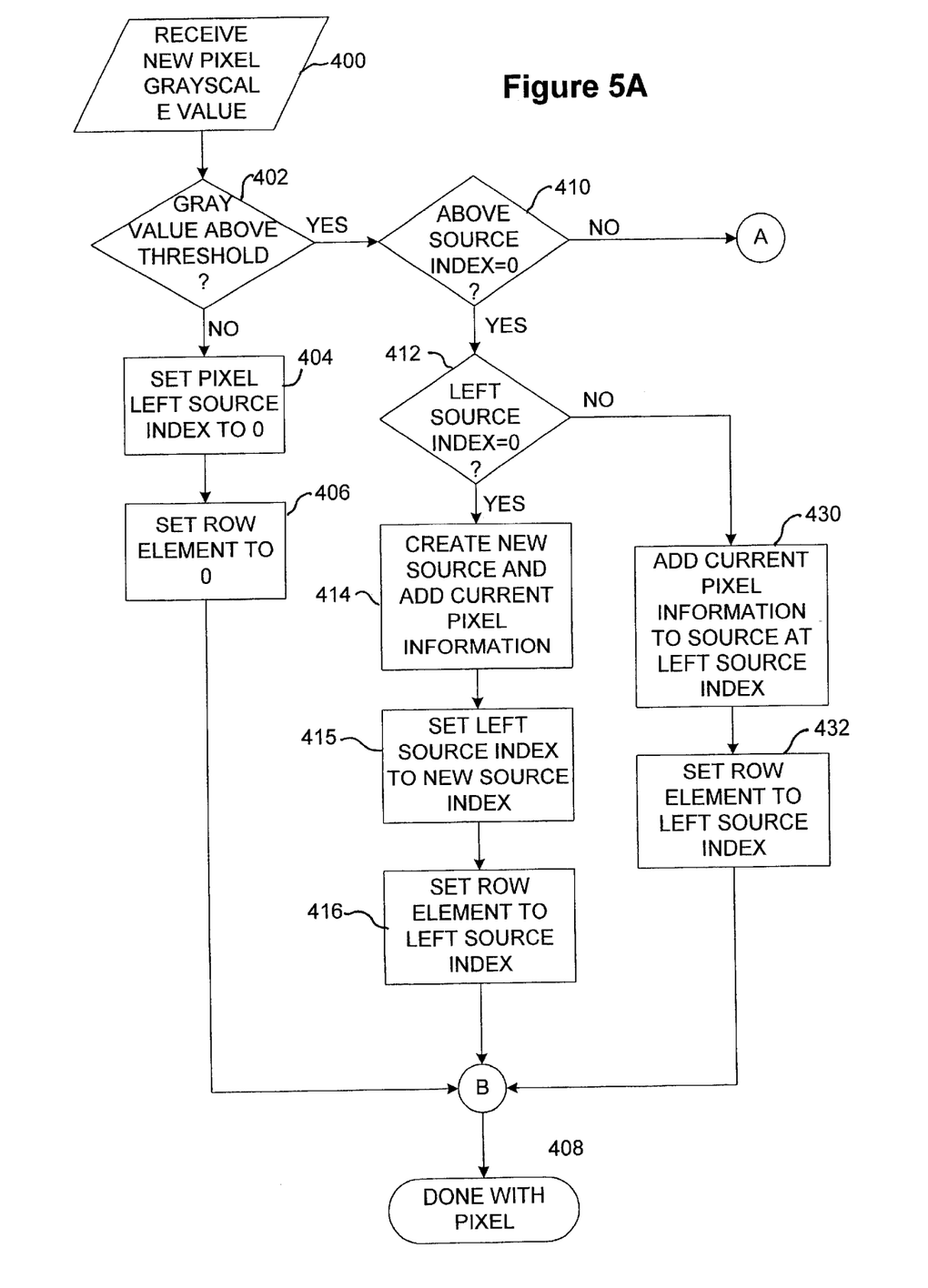
FIGS. 5A and 5B are a block diagram illustrating the flow of data in accordance with an image processing routine according to a second embodiment of the invention.
Figure 5B:
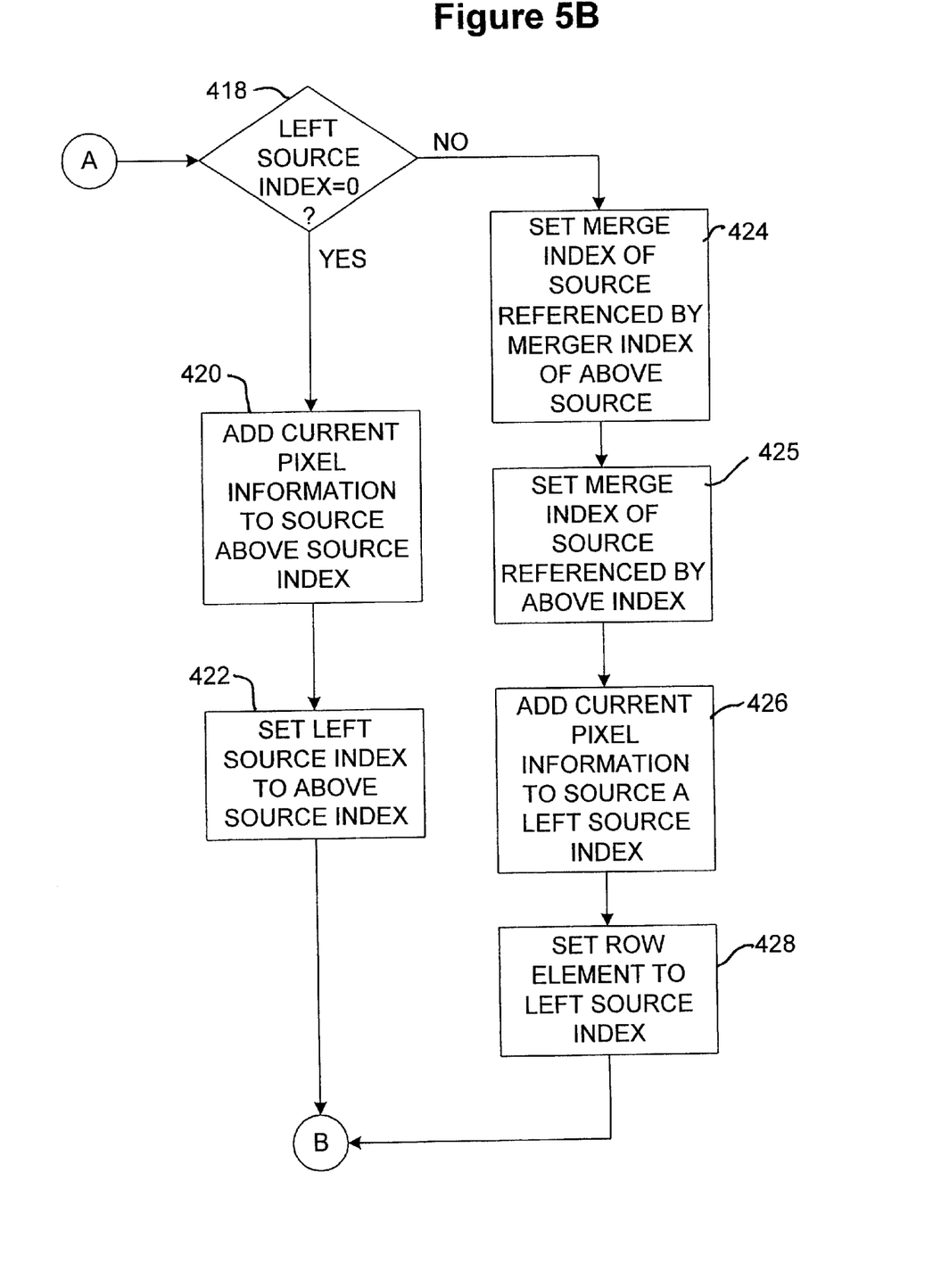

In a second embodiment, objects are again extracted from an image as the image is received. The object within an image are again defined as a set of connected pixels all of which have grayscale values above a threshold. An algorithm defining a method of detecting connected pixels within images as each image is being received is illustrated in FIGS. 5A and 5B. To execute this algorithm, three items are stored in memory. First, an object list is stored containing information about any objects that are detected. This list is implemented preferably as an array of structures with elements in each structure containing all necessary information about an object. The table below illustrates an example of one of the structures. The elements of this table can be used to compute the center of the source after the algorithm is completed. Additional information, such as the top, bottom, left, and right extents of the source may also be stored.

| | |
|---|---|
| TotalGV | The total grayscale value of all pixels in the row |
| Size | The total number of pixels in the object |
| TotalX | The sum of the x coordinates of all pixels in the object |
| TotalY | The sum of the y coordinates of all pixels in the object |
| Max | The maximum grayscale value of any pixel in the object |
| Merge | Index of a object that this object is to be merged with initially points to itself |

The next item stored is an array of object indices, the size of one row of the image being processed. These indices refer to the objects that contain the pixels in the row previously processed. The array elements are initialized to zero, indicating no light sources above the upper row of pixels. In the following description, the element of this array that corresponds to the current column is referred to as the above index. For example, if the pixel above the current pixel is contained in light source 2, the above index will contain the value 2.

Finally, a single object index is used to refer to the light source of the previous pixel processed, referred to as the "left index." The left index is initialized to zero at the start of each row. As each pixel is processed, it is either considered part of light source (numbered greater than zero) or not. At the end of pixel processing, the index of the light source (0 for no light source) is assigned to both the left index and row element corresponding to the current column. The above index is then obtained from the next column. Those skilled in the art will recognize that the value of the left index could be determined by referring to the previous above index. Other methods of storing values using pointers or addresses may be used as well. The value of left index or other values may be stored in registers rather than processor memory.

FIGS. 5A and 5B show a procedure for processing each pixel of image data as it is received from image sensor 101 in accordance with the second embodiment of the present invention. The procedure begins with step 400 in which processor 105 receives the gray scale value of a pixel within image sensor array 101. In step 402, processor 105 determines whether the gray scale value is above a predetermined threshold. If the gray scale value does not exceed the threshold, processor 105 performs step 404 whereby it sets the pixel left source index to zero and then sets the pixel above source index to zero in step 406. Processor 105 then receives the next pixel (step 408) in the row of image sensor 101 being processed. The procedure then moves back through to step 402 where the processor 105 again determines whether the gray scale value is above a threshold. Until such time that a pixel exceeds the grayscale value, the procedure loops through steps 400–408.

Upon detecting a pixel having a grayscale value above the threshold in step 402, processor 105 then proceeds to step 410 where it determines whether the above source index is no longer zero. Initially, the above source index is set to zero such that processor 105 would proceed to step 412 where it determines whether the left source index is no longer zero. Again, initially, the left source index would be equal to zero such that processor 105 would proceed to step 414 in which it creates a new source in the source list and adds the current pixel information including the row and column number and the grayscale value. Each time processor 105 creates a new source, it increments a new source index such that each source that is identified has its own unique index. After step 414, processor 105 sets the left and above index equal to the new source index (steps 415 and 416) prior to proceeding through steps 408 and 402 to determine whether the next pixel has a grayscale value above the threshold. Assuming the grayscale value is above the threshold, processor 105 checks in step 410 whether the above source index is no longer zero.

In this case, the above index now refers to the next pixel in the row array and equals 0 (no source). The left index, set in the previous pixel, is set to point to the current light source. This results in steps 410 and 412 passing control to step 430 where the current pixel information is added to this light source. The row array value corresponding to this column is set to this value in step 432.

In another case where the previous pixel was below the threshold (the left index=0) and the pixel above the current part of pixel is part of a light source (the above index≠0), steps 410 and 418 pass control to step 420. The current pixel information is added to the source referenced to by the above index. The left index is then set to the value of the above index in step 422.

The remaining condition, where the above index and left index are not equal to zero, results in execution of steps 424–428. These steps set merge pointers that link adjacent light sources. In the post processing, these pointers will be used to combine the light sources. First, in step 424, the source pointed to by the merge pointer of the source referenced by the above index is set to the left index. Although it is theoretically possible for the above index to be already merged with another source, further study may show this step to be unnecessary, since the effects of not merging these sources may be smaller than the time it takes to do this extra assignment. Then in step 425, the merge pointer of the light source referenced by the above index is set to the left index. If the light sources are the same, setting the merge pointer will have no effect. Following this, the current pixel information is added to the light source referenced by the left index. Finally, the row array element for this column is set to the left index.

When a pixel is detected as having a grayscale value below the threshold (in step 402) and when the prior pixel had a value that exceeded the threshold, the left source index and the above source index are reset to zero (steps 404 and 406) such that when the next pixel is detected that exceeds the threshold, it will be assigned to a new source (step 414). The process thus continues to loop through this image reception and processing phase to generate the working object list.

At the end of the image reception and processing phase, the working object list must be converted into a final object list. First, objects which must be merged are merged by adding all of the values from each object into one new object. A new object list is created containing the merged information. Additionally, the TotalX and TotalY variables are divided by the size variable to yield the X and Y center coordinates of the object.

The examples presented assume a serial control architecture as described in the above-referenced U.S. Pat. No. 5,990,469 where pixel values are received serially in the Receive Data Register (RDR) of the Synchronous Serial Interface peripheral of the Motorola microcontroller. With this configuration, there is sufficient time between the reception of subsequent pixels and subsequent rows to implement the steps outlined. However, with other controllers, it may be necessary to slow down the pixel transmission rate to achieve this while with other faster controllers, the pixel rate can be increased or additional processing can be accomplished between pixels. If insufficient time is available to complete the post-row processing step before the receipt of the next row, it is possible to store the row source list for each row until the end of image acquisition. This method still has the potential for substantial memory savings over storing the entire image. One skilled in the art will also appreciate that this method may be adapted to other image transmission schemes, such as a parallel image bus.

The above method of detecting objects can be modified to support the headlamp imaging function. In this modification, the method is implemented twice, once for each color window and two object lists are created and compared. Alternatively, if there is highly accurate spatial correlation between pixels in one subwindow and pixels in the other subwindow, the algorithm can be implemented once on one subwindow and when the corresponding row from the other subwindow is received, the corresponding pixel total grayscale values can be tallied and included in the row source list.

Analyzing images to produce a list of objects in the image has many advantages. Once this list is analyzed, the brightness, location, and other properties can be checked to determine if a response to the presence of these objects in the image is necessary. For example, in the headlamp control application, the presence of an object with a certain total grayscale value in a certain region of the image may require the high beams to be turned off.

As discussed above, the control circuit that is coupled to the image array sensor for processing the image of the scene obtained by the image array sensor may include one or more processors. Referring back to FIG. 2, a first processor 105 may be mounted within mirror bezel 200 whereas a second processor 105' may be mounted to a circuit board within mirror mount 207. In this manner, second processor 105' could receive and process the image data as it is read and develop the segment list or the object list in the above-noted processing procedures and then transfer these lists to first processor 105 for subsequent processing, such as the development of the white and red light lists. Second processor 105' could alternatively be used to create the red and white light lists and then transmit that information to first processor 105 that would analyze these lists and generate control signals to control the headlamps of the vehicle. By splitting the processing power in this manner, the amount of information that needs to be transmitted from within mirror mount 207 to mirror bezel 200 may be minimized thereby allowing first processor 105 to perform other processing tasks such as controlling the reflectivity of mirror 203.

As also explained above, the image processing system 100 of the present invention may be used for various applications, such as headlamp control and rain sensing. Because the same imaging system may be used for both these applications, the control circuit may be configured to process the image data for both such applications simultaneously so as to control the vehicle headlamps and the windshield wipers based upon information obtained using the image sensing system of the present invention. Additionally, the image processing system of the present invention may be used in a system for generating a collision avoidance warning when the vehicle is too close behind another vehicle. Additionally, the images obtained from the image processing system of the present invention could be used by an adaptive cruise control system, which varies the speed at which the cruise control is set based upon the proximity of the vehicle to other vehicles in front of the vehicle. Further, the images could be used in a system that generates a lane departure indication signal when it is detected that the vehicle has departed from its present lane. Such a signal could be used for various purposes, such as providing the driver with a lane departure warning. As with the combination of the rain detector and headlamp controller features in a common control circuit, any of the various applications noted above may be combined such that image data obtained from the inventive image processor system may be processed by a common control circuit, which may include one or more processors to thereby generate a collision avoidance warning, to control the speed of the vehicle, to control the vehicle headlamps, to control the vehicle windshield wipers, to control the vehicle climate control system, and/or to generate a lane departure indication signal.

The present invention can be used with a color image sensor to provide additional information about the color of objects in the scene. In the embodiments disclosed above, color (red vs. white) is sensed by using lenses of two different colors forming two images on different halves of the array. As an alternative a checkerboard or mosaic pattern may be deposited on to the array such that neighboring pixels are exposed to separate bands of light. A technique for depositing interference filters of different colors onto neighboring pixels is disclosed in U.S. Pat. No. 5,711,889 to Philip E. Buchsbaum, the entire disclosure of which is incorporated herein by reference. In one embodiment, neighboring pixels are alternatively coated with a red filter (R) and no filter (clear (C)) as illustrated in the table below.

| R | C | R | C |
|---|---|---|---|
| C | R | C | R |
| R | C | R | C |
| C | R | C | R |

In this embodiment the optics are slightly defocused such that the spot size from a distant point light source covers at least two pixels. In this way, an accurate reading of the red component of the object can be determined. The inventors have discovered that common color filter array technologies, typically employing polymer filters, will not withstand direct focused sunlight. In many automotive applications, the sun may be focused onto the array if a vehicle is traveling or parked such that the sun is within the field of view of the camera. Interference filters are far more robust and reflect the unwanted spectral bands of light rather than absorb them. As a result, their use overcomes the limitations of the prior filtering technologies and allows the construction of an automotive camera. These filters can be used not only with cameras which are used in applications which control vehicle equipment but also in applications where images are acquired and displayed to the driver for visual assistance.

In another embodiment, three-color interference filters can be used to construct a red, green, and blue (RGB) pixel array (or their complements) as illustrated in the table below.

| G | R | G | R |
|---|---|---|---|
| B | G | B | G |
| G | R | G | R |
| B | G | B | G |

A full color value for each pixel is determined by using the color of the current pixel and interpolating the other two colors from neighboring pixels with different filter colors. Techniques for performing this interpolation are well known in the art. In a simpler scheme, groups of four pixels are treated as one "super pixel." The lens is defocused enough such that the image of a point light source is blurred over a 2×2 block of pixels. For each block of 2×2 pixels the red, green, and blue colors components are determined from the individual pixels. This data can be represented as either three separate values or as an intensity and color value.

The use of a 2×2 super pixel simplifies processing and reduces the total number of values stored. This technique can be combined with any of the other techniques in an application requiring color imaging. For an application such as a high beam headlamp control system, traditional color interpolation can be used near the center of the image for increased resolution and the technique of using super pixels can be used away from center. Super pixels larger than 2×2 blocks can be used where substantially decreased resolution is acceptable. Instead of red, green, and blue, the complementary colors of magenta, cyan, and yellow could likewise be used.

By reducing the amount of memory space that need be allocated for processing the image data, either the amount of memory as a whole may be reduced or more of the memory may be used for storing light list histories or for other processing functions such as compass processing functions, electrochromic mirror control functions, telematics functions, etc. Thus, it is conceivable that processor 105 may be used for such other functions.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An imaging system for controlling vehicle equipment comprising:
    an image array sensor including a plurality of pixels, each said pixel operable to generate a signal indicative of the amount of light received on the pixel;
    an analog to digital converter for quantizing said signals from said pixels into a digital value; and
    a memory including a plurality of allocated storage locations for storing said digital values from said analog to digital converter, wherein the number of allocated storage locations in said memory is less than the number of pixels in said image array sensor.

2. The imaging system of claim 1 and further including a control circuit coupled to said image array sensor for controlling the brightness of vehicle headlamps in response to the brightness of objects detected in a scene imaged by said image array sensor.

3. The imaging system of claim 1 and further including a control circuit coupled to said image array sensor for controlling vehicle windshield wipers in response to the detection of moisture on the vehicle windshield as imaged by said image array sensor.

4. The imaging system of claim 1 and further including a control circuit coupled to said image array sensor for processing the image of the scene obtained from said image array sensor to generate a collision avoidance warning.

5. The imaging system of claim 1 and further including a control circuit coupled to said image array sensor for processing the image of the scene obtained from said image array sensor to generate a lane departure indication signal.

6. The imaging system of claim 1 and further including a control circuit coupled to said image array sensor for processing the image of the scene obtained from said image array sensor to control the speed of the vehicle.

7. A control system to control the headlamps of a vehicle comprising:
    an image array sensor including a plurality of pixels, each said pixel operable to generate a signal indicative of the amount of light received on the pixel;
    an optical system configured to image the scene forward of the controlled vehicle onto said image array sensor;
    an analog to digital converter for quantizing said signals from said pixels into a digital value; and
    a control circuit for processing the image of the scene obtained from said imaging system and for controlling the headlamps in response to objects detected in the processed scene, said control circuit including a memory including a plurality of allocated storage locations for storing said digital values from said analog to digital converter, wherein the number of allocated storage locations in said memory is less than the number of pixels in said image array sensor.

8. The headlamp control system of claim 7, wherein said control circuit generates a segment list identifying segments of adjacent ones of said pixels that generate a signal having a grayscale value above a threshold as the signals are received from said pixels.

9. The headlamp control system of claim 8, wherein said control circuit generates a list of white light sources in the imaged scene and a list of red light sources in the imaged scene based on information in said segment list.

10. The headlamp control system of claim 7, wherein said control circuit generates a list of objects in the imaged scene by linking adjacent pixels that generate signals having a grayscale value above a threshold as the pixels are received from said image array sensor.

11. The headlamp control system of claim 7, wherein said control circuit includes a first processor for processing the signals received from said image sensor, and a second processor coupled to said first processor for performing additional processing and for controlling the brightness of the headlamps.

12. The headlamp control system of claim 11, wherein said first processor generates a segment list identifying segments of adjacent ones of said pixels that generate a signal having a grayscale value above a threshold as the signals are received from said pixels.

13. The headlamp control system of claim 12, wherein said second processor receives the segment list from said first processor and identifies objects in the imaged scene based on information in said segment list.

14. The headlamp control system of claim 13, wherein said second processor generates a list of white light sources in the imaged scene and a list of red light sources in the imaged scene based on information in said segment list.

15. A control system to control the headlamps of a vehicle comprising:
    an image array sensor including a plurality of pixels, each said pixel operable to generate a signal indicative of the amount of light received on the pixel;
    an optical system configured to image the scene forward of the controlled vehicle onto said image array sensor; and
    a control circuit for processing the image of the scene obtained from said imaging system and for controlling the headlamps in response to objects detected in the processed scene, wherein said control circuit generates a segment list identifying segments of adjacent ones of said pixels that generate a signal having a grayscale value above a threshold as the signals are received from said pixels.

16. The headlamp control system of claim 15, wherein said control circuit generates a list of white light sources in the imaged scene and a list of red light sources in the imaged scene based on information in said segment list.

17. The headlamp control system of claim 16, wherein said control circuit includes a memory including a plurality of allocated storage locations for storing said digital values from said analog to digital converter, wherein the number of allocated storage locations in said memory is less than the number of pixels in said image array sensor.

18. An imaging system for a vehicle comprising:
    an image array sensor;
    an optical system configured to image the scene forward of the controlled vehicle onto said image array sensor; and
    a control circuit for processing the image of the scene obtained from said image array sensor to control the vehicle headlamps in response to objects detected in the processed scene, said control circuit is in communication with said image array sensor via a bus, said control circuit further processes the scene obtained from said image array sensor to perform at least one of the following functions: (a) to generate a collision avoidance warning; (b) to control the speed of the vehicle; (c) to generate a lane departure indication signal; and (d) to sense rain.

19. The imaging system of claim 18, wherein said control circuit further performs the function of controlling vehicle windshield wipers in response to information obtained from said image array sensor.

20. The imaging system of claim 18, wherein said control circuit further performs the function of controlling the vehicle climate control system in response to information obtained from said image array sensor.

21. The imaging system of claim 18, wherein said control circuit further performs the function of controlling the reflectivity of the vehicle rearview mirror.

22. The imaging system of claim 18, wherein said control circuit includes a single processor for performing said functions.

23. An imaging device for a vehicle comprising:
   an image sensor having a plurality of pixels arranged in an array; and
   a multi-layer interference filter disposed over said pixel array, said multi-layer interference filter being patterned so as to provide filters of different colors to neighboring pixels or groups of pixels.

24. The imaging device of claim 23, wherein said multi-layer interference filter has a checkerboard pattern of alternating colored filters with a different color filter for each adjacent pixel.

25. The imaging device of claim 24, wherein said alternating colors are red and clear.

26. The imaging device of claim 23, wherein said multi-layer interference filter has a mosaic pattern of red, green, and blue color, with different colors for each adjacent pixel.

27. The imaging device of claim 23, wherein said multi-layer interference filter has a mosaic pattern of magenta, cyan, and yellow color, with different colors for each adjacent pixel.

28. The imaging device of claim 23, wherein said interference filters reflects undesired spectral bands of light.

29. The imaging system of claim 18, wherein said bus is a serial interface.

30. The imaging system of claim 29, wherein said serial interface is a three wire serial interface which communicates image exposure Instructions from said control circuit to a timing and control circuit and communicates image data from said image array sensor to said control circuit.

31. The imaging system of claim 18, where said bus is a parallel bus.

32. The imaging system of claim 31, wherein said bus is configured to communicate image data with image control parameters on the same signal lines.

33. The imaging system of claim 31, wherein said bus is configured to communicate image data on separate lines from image control parameters.

34. The imaging system of claim 18, wherein said bus comprises analog signals configured as a common NTSC video signal.

35. The imaging system of claim 18, wherein said bus is a MOST bus.

36. The imaging system of claim 18, wherein said bus is an IEEE-1394 bus.

37. The imaging system of claim 18, wherein said bus is a CAN bus.

38. The imaging system of claim 18, wherein said bus conforms to the AMI-C specification.

39. The imaging system of claim 18, wherein said control circuit generates a segment list identifying segments of adjacent pixels that generate a signal having a grayscale value above a threshold as signals are received from said pixels.

40. The imaging system of claim 39, wherein said control circuit generates a list of white light sources in the imaged scene and a list of red light sources in the imaged scene based on information in said segment list.

41. The imaging system of claim 18, wherein said control circuit generates a list of objects in the imaged scene by linking adjacent pixels that generate signals having a grayscale value above a threshold as the pixels are received from said image array sensor.

42. The imaging system of claim 18, wherein said control circuit includes a first processor for processing the signals received from said image array sensor, and a second processor coupled to said first processor for performing additional processing and for controlling the brightness of the headlamps.

43. The imaging system of claim 42, wherein said first processor generates a segment list identifying segments of adjacent pixels that generate a signal having a grayscale value above a threshold as the signals are received from said pixels.

44. The imaging system of claim 43, wherein said second processor receives the segment list from said first processor and identifies objects in the imaged scene based on information in said segment list.

45. The imaging system of claim 44, wherein said second processor generates a list of white light sources in the imaged scene and a list of red light sources in the imaged scene based on information in said segment list.

* * * * *